(12) United States Patent
Young et al.

(10) Patent No.: US 12,646,255 B2
(45) Date of Patent: Jun. 2, 2026

(54) APPARATUS AND METHODS FOR PROVIDING A MAP LAYER INCLUDING ONE OR MORE LIGHT-BASED OBJECTS AND USING THE MAP LAYER FOR LOCALIZATION

(71) Applicant: HERE GLOBAL B.V., Eindhoven (NL)

(72) Inventors: Jeremy Michael Young, Chicago, IL (US); Leon Stenneth, Chicago, IL (US); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 1211 days.

(21) Appl. No.: 17/497,642

(22) Filed: Oct. 8, 2021

(65) Prior Publication Data

US 2025/0225727 A1     Jul. 10, 2025

(51) Int. Cl.
| | |
|---|---|
| *G06T 17/05* | (2011.01) |
| *G06T 7/70* | (2017.01) |
| *G06V 10/60* | (2022.01) |

(52) U.S. Cl.
CPC .............. *G06T 17/05* (2013.01); *G06T 7/70* (2017.01); *G06V 10/60* (2022.01)

(58) Field of Classification Search
CPC ............ G06T 17/05; G06T 7/70; G06V 10/60
USPC ........................................................ 345/419
See application file for complete search history.

(56) References Cited

U.S. PATENT DOCUMENTS

| | | | |
|---|---|---|---|
| 3,821,697 A | 6/1974 | Brown | |
| 2011/0285842 A1 | 11/2011 | Davenport et al. | |
| 2013/0147964 A1* | 6/2013 | Frank | G06V 40/10 |
| | | | 348/159 |
| 2016/0098859 A1* | 4/2016 | Kishikawa | G06T 11/60 |
| | | | 345/426 |
| 2016/0162747 A1* | 6/2016 | Singh | G06V 10/22 |
| | | | 348/148 |
| 2017/0287225 A1* | 10/2017 | Powderly | G06F 3/013 |
| 2017/0317748 A1 | 11/2017 | Krapf | |

FOREIGN PATENT DOCUMENTS

| | | |
|---|---|---|
| CN | 112484713 A | 3/2021 |

OTHER PUBLICATIONS

Rajagopal, et al., "Visual Light Landmarks for Mobile Devices," Electrical and Computer Engineering Carnegie Mellon University (12 pgs).

* cited by examiner

*Primary Examiner* — Hai Tao Sun
(74) *Attorney, Agent, or Firm* — Peter H. Yu; HERE GLOBAL B.V.

(57)     ABSTRACT
An apparatus, method and computer program product are provided to update a map layer including one or more light-based objects and use the map layer for localization. For example, the apparatus is configured to receive image data including a plurality of images of a light-based object generated by a source, use the image data to create a representation of the light-based object, and update a map layer to include the representation as a landmark. The apparatus is further configured to receive an image captured by an image capturing device and including the light-based object and perform localization for the image capturing device by using the image and the map layer.

15 Claims, 15 Drawing Sheets

START

1001 — RECEIVING AN IMAGE CAPTURED BY AN IMAGE CAPTURING DEVICE OF AN ENTITY AND INCLUDING A LIGHT-BASED OBJECT

1003 — PERFORMING LOCALIZATION FOR THE ENTITY BY USING THE IMAGE AND A MAP LAYER INCLUDING A REPRESENTATION OF THE LIGHT-BASED OBJECT AS A LANDMARK

END

1200

MOBILE TERMINAL
1301

APPARATUS AND METHODS FOR PROVIDING A MAP LAYER INCLUDING ONE OR MORE LIGHT-BASED OBJECTS AND USING THE MAP LAYER FOR LOCALIZATION

TECHNICAL FIELD

The present disclosure generally relates to the field of using one or more light-based objects for localization, associated methods and apparatus, and in particular concerns, for example, an apparatus configured to provide a map layer including one or more light-based objects based on image data and using the map layer to provide localization.

BACKGROUND

Localization methods rely on attributes of physical objects in an environment. One of such methods includes using GPS to generally locate an entity, such as a vehicle, and estimating a location of the entity within a map by matching what the entity observes to the map. In such method, the entity may identify specific landmarks, such as poles, road signs, and/or curbs, and measure the entity's distance from each of the landmarks to estimate the location of the entity. However, such method may not be reliable for certain circumstances that render visibility of such landmarks obscured.

BRIEF SUMMARY

According to a first aspect, an apparatus including at least one processor and at least one non-transitory memory including computer program code instructions is described. The computer program code instructions are configured to, when executed, cause the apparatus to receive image data including a plurality of images of a light beam generated by a source, use the image data to create a representation of the light beam, and update a map layer to include the representation as a landmark.

According to a second aspect, a non-transitory computer-readable storage medium having computer program code instructions stored therein is described. The computer program code instructions, when executed by at least one processor, cause the at least one processor to receive an image captured by an image capturing device and including a light beam generated by a source, and perform localization for the image capturing device by using the image and a map layer including a representation of the light beam as a landmark.

According to a third aspect, a method of acquiring location information of an entity is described. The method includes receiving an image captured by an image capturing device equipped by the entity at a heading facing a light beam generating source, analyzing the image and, responsive to the image including a light beam generated by the light beam generating source, determining the location information of the entity by using the image and a map layer including a representation of the light beam as a landmark.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person. Also, fewer, more or different steps may be provided.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 5 illustrates an example representation of a light beam that is divided into a plurality of zones;

DETAILED DESCRIPTION

Navigating entities, such as vehicles, aircrafts, drones, and/or other robots may utilize localization to determine where on a map the entities are most likely to be located by analyzing landmarks observed by sensors equipped by the entities. One localization technique may involve acquiring GPS coordinates of an entity that is being localized, acquiring images of landmarks from image sensors equipped by the entity, deriving localization features (e.g., edges, corners, curves, etc.) of at least one of the landmarks from the images, compare the localization features to corresponding features in a map, and estimating a location of the entity in the map based on the comparison. However, visibility of landmarks may become obscured due to adverse weather conditions, lack of light, and objects that obstruct visibility such as other vehicles, buildings, etc. Further, aircrafts that are attempting to perform localization may be limited in options for observing landmarks. Such options may become further limited when the aircrafts fly above a layer of cloud or during night-time. There will now be described an apparatus and associated methods that may address these issues.

Figure 1A:
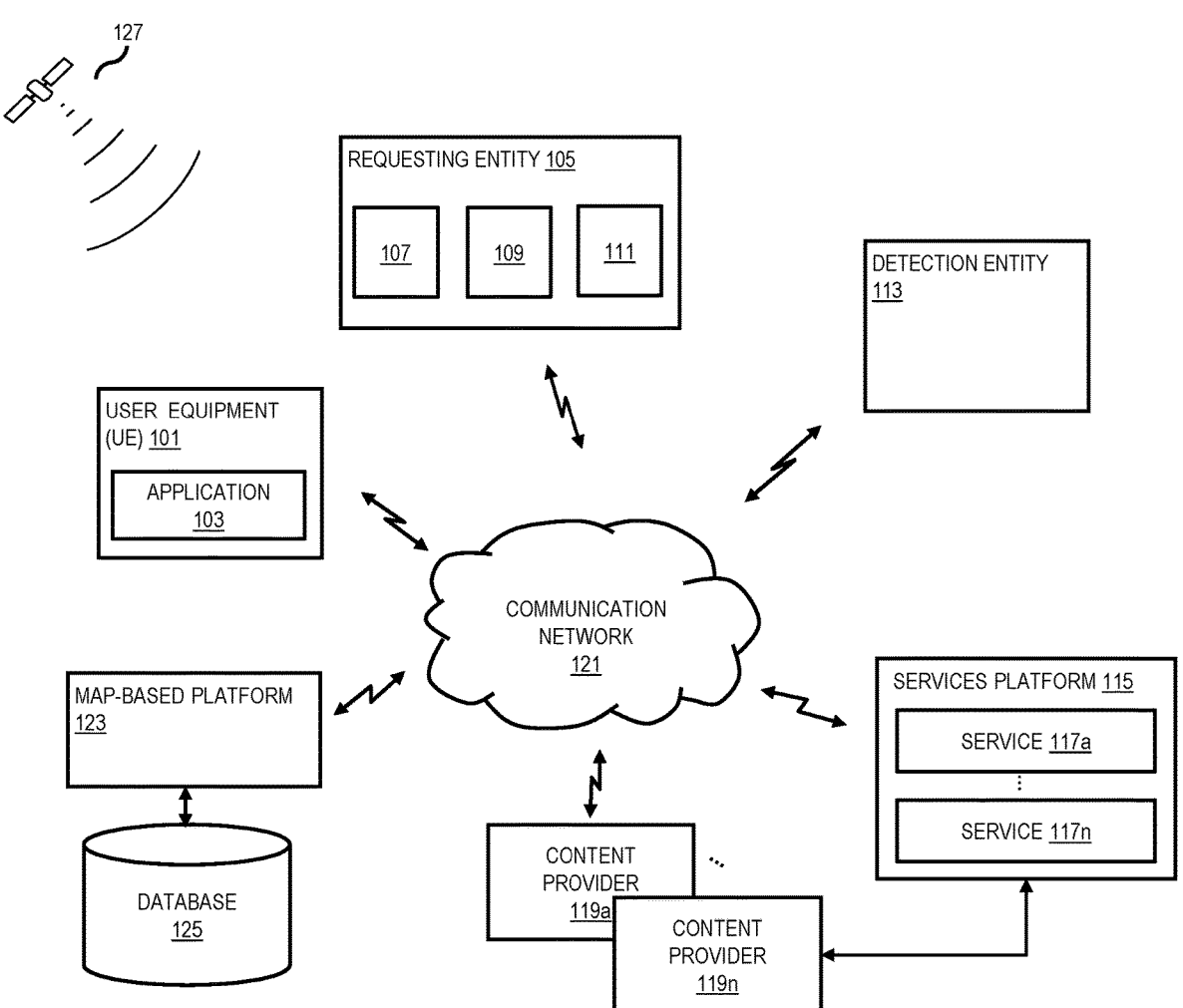
FIG. 1A illustrates a diagram of a system capable of providing a map layer including one or more light-based objects.

FIG. 1A is a diagram of a system 100 capable of providing a map layer including one or more light-based objects, according to one embodiment. Herein, a light-based object refers to an illumination having a distinct shape or a medium that defines a shape of light and is capable of being mapped and used as a reference for localization. By way of example, a light-based object may be a light beam generated by one or more light beam generating devices mounted on a landmark. A light beam generating device may project a light beam generally towards the atmosphere at a "high" level of intensity, thereby enabling an observer at a significant distance (e.g., several kilometres) from the light beam generating device to observe the light beam. By way of another example, a light-based object may be a portion of a cloud layer that defines a shape of light when light generated from an artificial source is projected on to the cloud layer at night-time. In the illustrated embodiment, the system includes a user equipment (UE) 101, a requesting entity 105, a detection entity 113, services platform 115, content providers 119a-119n, a communication network 121, a map-based platform 123, a database 125, and a satellite 127. Additional or a plurality of mentioned components may be provided.

In the illustrated embodiment, the system 100 comprises a user equipment (UE) 101 that may include or be associated with an application 103. In one embodiment, the UE 101 has connectivity to the map-based platform 123 via the communication network 121. The map-based platform 123 performs one or more functions associated with providing a map layer of one or more light-based objects. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, a user-interface or device associated with or integrated with one or more requesting entities 105, or any combination thereof, including the accessories and peripherals of these devices. In one embodiment, the UE 101 can be a navigation system, a personal navigation device (PND), a portable navigation device, a cellular telephone, a mobile phone, a personal digital assistant (PDA), a watch, a camera, a computer, etc. In one embodiment, the one or more vehicles may have cellular or Wi-Fi connection either through the inbuilt communication equipment or from the UE 101 associated with the vehicles. It should be appreciated that the UE 101 can support any type of interface to the user (such as "wearable" devices, etc.).

In the illustrated embodiment, the application 103 may be any type of application that is executable by the UE 101, such as a navigation application, a mapping application, a location-based service application, a content provisioning service, a camera/imaging application, a media player application, a social networking application, a calendar application, or any combination thereof. In one embodiment, one of the applications 103 at the UE 101 may act as a client for the map-based platform 123 and perform one or more functions associated with the functions of the map-based platform 123 by interacting with the map-based platform 123 over the communication network 121. In one embodiment, a user may access the application 103 through the UE 101 for performing functions associated with the map-based platform 123 and/or receiving information regarding the functions. In one embodiment, the application 103 may assist in conveying information regarding at least one attribute associated with an area (e.g., a town or a city) via the communication network 121. Such information may indicate locations of one or more light-based objects within the area.

The requesting entity 105 may be a device or a machine requesting localization. The requesting entity 105 may be a land-based vehicle, an aircraft, a probe, or a robot having mobility that is equipped with sensors 107 for detecting objects for localization, an on-board computing platform 109 for processing sensor data, and an on-board communications platform 111 for receiving and/or transmitting data. The requesting entity 105 may be mobile and such mobility may be powered via one or more engines in combination with other devices or components (e.g., wheels, rotors, wings, etc.). The requesting entity 105 may be manually controlled, semi-autonomous (e.g., some routine motive functions, such as parking or auto-pilot features, are controlled by the requesting entity 105), or fully autonomous (e.g., motive functions are controlled by the requesting entity 105 without direct operator input).

In the illustrated embodiment, the sensors 107 may include image sensors (e.g., electronic imaging devices of both analog and digital types, which include digital cameras, camera modules, camera phones, thermal imaging devices, radar, sonar, lidar, etc.), a global positioning sensor for gathering location data, a signal detection sensor for detecting wireless signals or receivers for different short-range communications (e.g., Bluetooth, Wi-Fi, Li-Fi, near field communication (NFC), etc.), temporal information sensors, audio recorders for converting sound to sound data, velocity sensors, light sensors, oriental sensors augmented with height sensor and acceleration sensor, tilt sensors to detect the degree of incline or decline of the requesting entity 105, etc. In a further embodiment, sensors 107 about the perimeter of the requesting entity 105 may detect the relative distance of the requesting entity 105 from objects such as light beams, vehicles, aircrafts, POIs, establishments, stationary sensory devices within an area, road objects (e.g., road markings or landmarks), lanes, or roadways, pedestrians, traffic lights, road features (e.g., curves) and any other objects, or a combination thereof. In one embodiment, the requesting entity 105 may include GPS receivers to obtain geographic coordinates from satellites 127 for determining current location and time associated with the requesting entity 105. Further, the location can be determined by a triangulation system such as A-GPS, Cell of Origin, or other location extrapolation technologies.

The on-board computing platform 109 performs one or more functions associated with the requesting entity 105. For example, such functions be defined, at least in part, by algorithms for providing mobility for the requesting entity 105, algorithms for processing sensor data acquired by the sensors 107 (e.g., image classification), algorithms for performing localization based on the sensor data and other data (e.g., map data) received from other entities/components within the system 100. In one embodiment, the on-board computing platform 109 may aggregate sensor data generated by at least one of the sensors 107 and transmit the sensor data via the on-board communications platform 111. The on-board computing platform 109 may receive control signals and/or other signals for performing one or more of the functions associated with the map-based platform 123, the UE 101, the services platform 115, one or more of the content providers 119*a*-119*n*, or a combination thereof via the on-board communications platform 111. The on-board computing platform 109 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 111 includes wired or wireless network interfaces to enable communication with external networks. The on-board communications platform 111 also includes hardware (e.g., processors, memory, storage, antenna, etc.) and software to control the wired or wireless network interfaces. In the illustrated example, the on-board communications platform 111 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); NFC; local area wireless network (including IEEE 802.11 a/b/g/n/ac or others), dedicated short range communication (DSRC), and Wireless Gigabit (IEEE 802.11ad), etc.). In some examples, the on-board communications platform 111 includes a wired or wireless interface (e.g., an auxiliary port, a Universal Serial Bus (USB) port, a Bluetooth® wireless node, etc.) to communicatively couple with the UE 101.

The detection entity 113 may be equipped with one or more image sensors capable of capturing one or more images including one or more objects within an external environment and generating image data corresponding to said captured images. The detection entity 113 may be further equipped with a communication interface (i.e., wired or wireless communication means) for providing the image data to the map-based platform 123. The detection entity 113 may be, for example, one or more other UEs (e.g., having similar capabilities as the UE 101), one or more other vehicles, aircrafts, probes, or robots having mobility (e.g., having similar capabilities as the requesting entity 105), one or more stationary roadside devices equipped with sensors (e.g., traffic cameras), or a combination thereof. In one embodiment, the detection entity 113 may generate, acquire, and/or store contextual information indicating a location at which the detection entity 113 has captured an image, a direction/heading at which the detection entity 113 has captured the image, a time at which the detection entity has captured the image, or a combination thereof. The detection entity 113 may transmit the contextual information with the image data to the map-based platform 123 over the communication network 121.

The services platform 115 may be an original equipment manufacturer (OEM) platform that provides one or more services 117*a*-117*n* (collectively referred to as services 117). In one embodiment, the one or more services 117 may be sensor data collection services. By way of example, sensor data acquired by the sensors 107 may be transferred to the UE 101, the map-based platform 123, the database 125, or other entities communicatively coupled to the communication network 121 through the services platform 115. By way of example, the services platform 115 may also be other third-party services and include mapping services, navigation services, weather-based services, travel planning services, notification services, social networking services, content (e.g., audio, video, images, etc.) provisioning services, application services, storage services, contextual information determination services, location-based services, information-based services, etc. In one embodiment, the services platform 115 uses the output data generated by of the map-based platform 123 to provide services such as navigation, mapping, other location-based services, etc.

In one embodiment, the content providers 119*a*-119*n* (collectively referred to as content providers 119) may provide content or data (e.g., including geographic data, parametric representations of mapped features, etc.) to the UE 101, the requesting entity 105, services platform 115, the map-based platform 123, the database 125, or the combination thereof. The content provided may be any type of content, such as map content, textual content, audio content, video content, image content, etc. In one embodiment, the content providers 119 may provide content that may aid in acquiring information regarding one or more light-based objects (e.g., location of the landmark, a number of light generating devices installed in the landmark, one or more periods in which the light generating device is activated, etc.). In one embodiment, the content providers 119 may also store content associated with the UE 101, the requesting entity 105, detection entity 113, services platform 115, the map-based platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the map-based platform 123 may be a platform with multiple interconnected components. The map-based platform 123 may include multiple servers, intelligent networking devices, computing devices, components and corresponding software for providing a map layer including one or more light-based objects. It should be appreciated that that the map-based platform 123 may be a separate entity of the system 100, included within the UE 101 (e.g., as part of the applications 103), included within the requesting entity 105 (e.g., as part of an application stored in memory of the on-board computing platform 109), included within the services platform 115 (e.g., as part of an application stored in server memory for the services platform 115), included within the content providers 119 (e.g., as part of an application stored in server memory for the content providers 119), or a combination thereof.

The map-based platform 123 is capable of updating a map layer to include one or more light-based objects and using the map layer and one or more images captured by the requesting entity 105 to localize the requesting entity 105. To update the map layer to include a light-based object, such as a light beam, the map-based platform 123 may acquire location information of a source of the light beam. The location information may indicate an exact location of the source, or the location information may simply indicate the location of a landmark (will be referred as a "light-based landmark," herein) that includes the source. Assuming the latter, the map-based platform 123 may estimate the exact location of the source by: (1) receiving image data acquired by one or more image sensors of a detection entity 113 that is within a proximity of the light-based landmark; (2) estimating the distance between the detection entity and the source based on the image data; (3) determining the exact location of the source based on the estimated distance; and (4) continuously receiving one or more image data acquired by one or more images sensors of one or more additional detection entities 113 that is within the proximity of the light-based landmark and at one or more different positions to validate the estimated distance or correct the exact location of the source. The image data may include: (1) an image captured by an image sensor; (2) spatial data indicating a location and orientation (e.g., angle and height) at which an image was captured; and (3) temporal data indicating a time and date at which the image was captured.

In one embodiment, the location information of a source or a light-based landmark may not be available. As such, the map-based platform 123 may receive image data acquired by one or more image sensors of a detection entity 113 to determine whether the image data indicate existence of a light beam. If the detection entity 113 acquires image data indicating existence of a light beam, the map-based platform 123 may process the image data to estimate the location of the source based on: (1) the location and the orientation at which the detection entity 113 has acquired the image data; (2) one or more landmarks that is within the image data and is mapped in a map layer; (3) whether the source is visible in the image of the image data; or (4) a combination thereof. The existence of the light beam and the location information of the source may be continuously validated and/or updated based on image data acquired from one or more other detection entities 113 that is proximate to the estimated location of the light-based landmark.

If the location of the source is identified, the map-based platform 123 may use image data acquired by one or more detection entities 113 within the proximity of the light-based landmark to generate a representation of the light beam for a map layer. In one embodiment, the map-based platform

123 may a use the image data to create a representation of the light beam by: (1) identifying attributes of the light beam, such as an angle at which the light beam is projecting, a shape of the light beam, and a size of the light beam; (2) define a center line of the light beam based on the attributes; and (3) identify a general three-dimensional (3D) polygon that corresponds to the shape of the light beam and affix the polygon to the center line. In one embodiment, the map-based platform 123 may use the image data to create a representation of the light beam as a wireframe attribute in the map layer with 3D coordinates. The map-based platform 123 may identify the light beam within an image of the image data as a two-dimensional (2D) shape and correlate the 2D shape to 3D coordinates based on a predetermined sizing.

One image of the light beam captured by a detection entity 113 may be sufficient to map the light beam in the map layer; however, the map-based platform 123 can localize the requesting entity 105 in view of the light beam only if an image sensor of the requesting entity 105 is within the same or substantially the same angle at which the image was captured by the detection entity 113. If three images of the light beam are captured by the detection entities 113 at three locations, where each location is 120 degrees apart from each other, the map-based platform 123 may create a 3D representation of the light beam in the map layer. The representation of the light beam may be further refined as the map-based platform 123 continues to receive and process images of the light beam at different angles.

In one embodiment, the image data may be used to generate additional attributes associated with the light beam. By way of example, said additional attributes may be: (1) intensity of the light beam; (2) type of light beam; (3) colour of light beam; or (4) a combination thereof. A plurality of image data collected over time may be used to generate time-based attributes, such as: (1) one or more periods in which the light beam is activated throughout a day; (2) a pattern in which the light beam is activated/deactivated; (3) a pattern in which the intensity of the light beam fluctuates; (4) a pattern in which the colour of the light beam changes; or (5) a combination thereof. In one embodiment, the map-based platform may analyze a plurality of image data collected over time to determine whether the light beam is a dynamic light beam (i.e., a moving light beam). In one embodiment, if the light beam is a dynamic light beam, the map-based platform may determine whether the dynamic light beam moves at speed that does not exceed a predetermined threshold speed. The predetermined threshold speed may be a speed at which a requesting entity 105 cannot readily identify features of the dynamic light beam from image data for localization. In one embodiment, if the light beam is a dynamic light beam, the map-based platform may track a series of positions at which the dynamic light beam moves to determine a light beam movement zone. Herein, a light beam movement zone defines an area occupied by the series of movement. In one embodiment, the light beam movement zone may be used as a representation of the light beam within a map layer, and the light beam movement zone may be used to localize the requesting entity 105.

In one embodiment, the map-based platform 123 may identify a length of the light beam by analyzing one or more images. In such embodiment, the map-based platform 123 may define a terminating end of the length of the light beam as a portion of the light beam that fades to darkness. In one embodiment, the map-based platform 123 may identify one or more landmarks mapped in a map layer within the one or more images and acquire attributes associated with the one or more landmarks, such as a size of a landmark. In such embodiment, the map-based platform 123 may estimate the length of the light beam based on a comparison between the light beam and the size of the one or more landmarks. In one embodiment, the map-based platform 123 may acquire light attribute data associated with a light-based landmark, where the light attribute data indicate a length of a light beam generated by the light-based landmark. In one embodiment, the map-based platform 123 may acquire light attribute data associated with a light-based object, where the light attribute data indicate an intensity at which one or more light generating devices of the light-based landmark generates a light beam. Based on the intensity of the light beam, the map-based platform 123 may estimate the length at which the light beam is projected.

In one embodiment, the representation of the light beam may be divided into a plurality of zones and each of the zones may be assigned with a light attribute score, where the light attribute score is a function of a brightness/contrast level. By way of example, light attribute scores may range from a scale of 0 to 1.0, and a zone closest to the source may have a light attribute score of 1.0, thereby indicating that the zone is the brightest among the plurality of zones; whereas a zone furthest from the source may a have a light attribute score of 0, thereby indicating that the zone is the darkest among the plurality of zones. The representation of the light beam may be divided along the length of the light beam. As such, the length of each of the zone may equate to a predetermined distance. Since each of the plurality of zones is assigned a light attribute score, and each of the zones equates to a predetermined distance, the map-based platform 123 may: (1) receive an image of the light beam; (2) estimate an angle at which the light beam is projected from the image; and (3) estimate a range of altitudes at which each of the zones is within based on the angle.

It is contemplated that a visibility of a light beam is affected by an amount of light within an environment in which the light beam is projected. Such amount of light may vary based on: (1) a sun angle; (2) an amount of active artificial light sources proximate to the light beam; (3) and weather conditions. The map-based platform 123 may account for such factors by assigning a confidence value indicating a confidence of which a representation of a light beam can be relied upon for accurate localization. As such, the greater the confidence value, the greater the confidence at which the map-based platform 123 can accurately provide localization for the requesting entity 105 by using the representation of the light beam. The confidence value may be a function: (1) a sun angle with respect to an area in which the light beam is projected; (2) a number of active artificial light sources within the area and the intensity of light generated therefrom; and (3) weather conditions affecting the area. In one embodiment, the map-based platform 123 may calculate the sun angle based on time and day at which a representation of a light beam is relied upon for localization. For example, if the calculated sun angle indicates an angle of the sun during daytime, the confidence value may decrease; whereas, if the calculated sun angle indicates an angle of the sun during night-time, the confidence value may increase. In one embodiment, the map-based platform 123 may receive attribute data associated with one or more artificial light sources to determine a number of activate artificial light sources and the intensity of light generated therefrom. In one embodiment, the map-based platform 123 may receive weather data associated an area in which the light beam is projected. For example, if the weather data indicates a weather condition such as fogginess, the confidence value may decrease; whereas if the weather data indicates a clear weather condition, the confidence value may increase.

In one embodiment, weather data associated with an area in which a light beam is projected may indicate an existence of a cloud and the altitude thereof. Using the weather data, the map-based platform 123 may determine an altitude at which the light beam can be relied upon for localization. Alternatively, in one embodiment, the map-based platform 123 may: (1) acquire an image of the light beam contacting the cloud ceiling; (2) identify a portion of the light beam contacting the cloud ceiling; (3) identify the light attribute score of the portion; (4) identify a zone among a plurality of zones that corresponds to the light attribute score; and (5) estimate the altitude based on the zone that corresponds to the light attribute score.

The map-based platform 123 is not limited to mapping light beams for localization. In one embodiment, the map-based platform 123 may map other light-based objects, such as portions of cloud layers that define shapes of light when light generated from artificial sources is projected on to the cloud layers at night-time (will be referred as "cloud light formations," herein). By way of example, a portion of a cloud layer over a city may define a distinct shape of light when light generated from the city is projected on to the cloud layers at night-time. A similar shape of light may be observed for each weather condition that renders a similar type of cloud formation over the city. As such, the distinct shape of light formed in the cloud layer may be mapped by the map-based platform 123 for localization. Similar to acquiring image data of light beams, one or more detection entities 113 may acquire image data including one or more images of a layer of cloud formed over a city. Such image data may be acquired by one or more airborne detection entities 113. As such a shape of light formed on a cloud layer may be observed at a top surface of the cloud layer. The shape of light may be included in a map layer, and airborne requesting entities 105 may observe the shape of light at the top surface of the cloud layer and refer to the map layer including one or more cloud light formations for localization.

In the illustrated embodiment, the database 125 stores any multiple types of information that can provide means for aiding in providing a map layer of one or more light-based landmarks. By way of example, the data 125 may store information on road links (e.g., road type, road length, road breadth, slope information, lane information, curvature information, etc.), road nodes, probe data for one or more road links (e.g., traffic density information), POIs, location and attribute information associated with one or more light generating devices, etc. It should be appreciated that the information stored in the database 125 may be acquired from any of the elements within the system 100, other vehicles, sensors, database, or a combination thereof. Contents of the database 125 will be further described in detail with reference to FIG. 1B.

In one embodiment, the UE 101, the requesting entity 105, the detection entity 113, the services platform 115, the content providers 119, and the map-based platform 123 communicate with each other via the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises: (1) header information associated with a particular protocol; and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
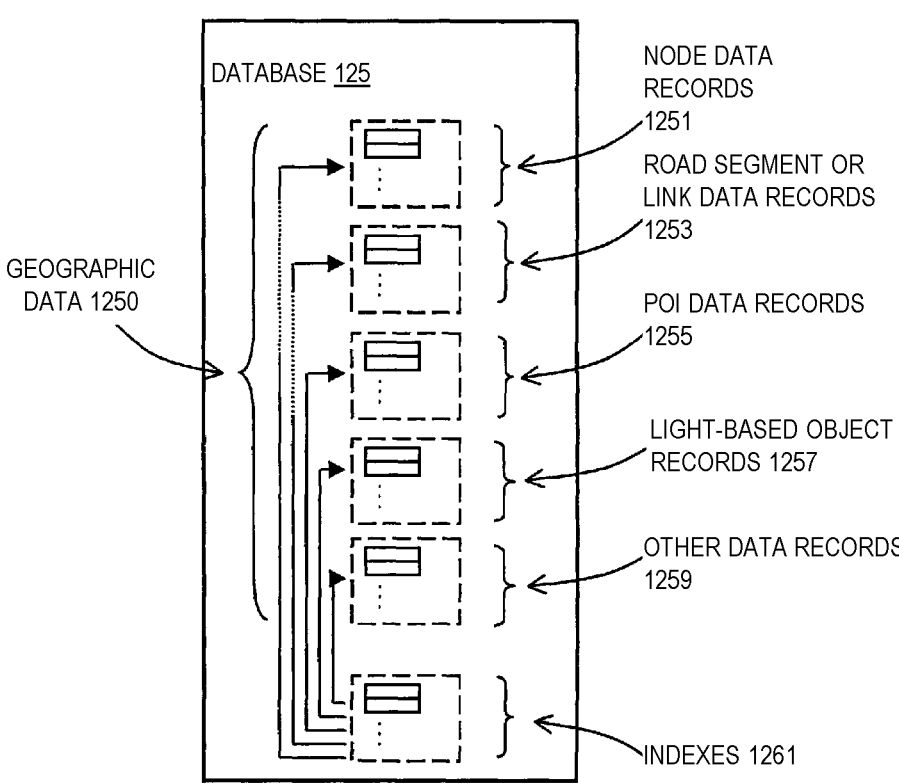
FIG. 1B illustrates a diagram of the database of FIG. 1A.

FIG. 1B is a diagram of a database 125 (e.g., a map database), according to one embodiment. In one embodiment, the database 125 includes geographic data 1250 used for (or configured to be compiled to be used for) mapping and/or navigation-related services. In one embodiment, the following terminology applies to the representation of geographic features in the database 125.

a. "Node"—A point that terminates a link.

b. "Road segment"—A straight line connecting two points.

c. "Link" (or "edge")—A contiguous, non-branching string of one or more road segments terminating in a node at each end.

In one embodiment, the database 125 follows certain conventions. For example, links do not cross themselves and do not cross each other except at a node. Also, there are no duplicated shape points, nodes, or links. Two links that connect each other have a common node.

As shown, the database 125 includes node data records 1251, road segment or link data records 1253, POI data records 1255, light-based object records 1257, other records 1259, and indexes 1261, for example. More, fewer or different data records can be provided. In one embodiment, additional data records (not shown) can include cartographic ("carto") data records, routing data, and maneuver data. In one embodiment, the indexes 1261 may improve the speed of data retrieval operations in the database 125. In one embodiment, the indexes 1261 may be used to quickly locate data without having to search every row in the database 125 every time it is accessed.

In exemplary embodiments, the road segment data records 1253 are links or segments representing roads, streets, or paths, as can be used in the calculated route or recorded route information for determination of one or more personalized routes. The node data records 1251 are end points (such as intersections) corresponding to the respective links or segments of the road segment or link data records 1253. The node data records 1251 may indicate node type, node size, a number of intersecting road segments or links, lane information, traffic control information, or a combination thereof. The road segment or link data records 1253 and the node data records 1251 represent a road network, such as used by vehicles, cars, and/or other entities. Alternatively, the database 125 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, variance types, and other attributes, as well as POIs, such as gasoline stations, hotels, restaurants, museums, stadiums, offices, automobile dealerships, auto repair shops, stores, other buildings, parks, tunnels, etc. The database 125 can include data about the POIs and their respective locations in the POI data records 1255. The data about the POIs may include data about places, such as cities, towns, or other communities, and other geographic features, such as bodies of water, mountain ranges, etc. Such place or feature data can be part of the POI data records 1255 or can be associated with POIs or POI data records 1255 (such as a data point used for displaying or representing a position of a city).

In one embodiment, the database 125 includes light-based object records 1257. In one embodiment, the light-based object records 1257 may include location information indicating a location of a source capable of generating a light beam, a location of a light-based landmark, or a combination thereof. The location information may be associated with one or more image data acquired from one or more detection entities 113. Each image data may include: (1) one or more images captured by an image sensor of a detection entity; (2) spatial data indicating a location and orientation (e.g., angle and height) at which an image was captured; and (3) temporal data indicating a time and date at which the image was captured. The light-based object records 1257 may also include weather data indicating a weather condition affecting a location at a time and date at which the image was captured and associate the weather data with the image data. The light-based object records 1257 may also include a representation of the light beam in a map layer. The representation may be defined with a line and a general 3D polygon extending along the line. Alternatively, the representation may be defined as a wireframe attribute in the map layer with 3D coordinates. The light-based object records 1257 may further indicate other attributes of light beams, such as: (1) an angle of the light beam; (2) a type of light beam generated; (3) intensity of the light beam; (4) type of light beam; (5) colour of light beam; (6) one or more periods in which the light beam is activated throughout a day; (7) a pattern in which the light beam is activated/deactivated; (8) a pattern in which the intensity of the light beam fluctuates; (9) a pattern in which the colour of the light beam changes; (10) a light beam movement zone; (11) a length of a light beam; (12) a number of zones; (13) light attribute score of each zone; (14) a length of each zone; (15) a confidence value; or (16) a combination thereof. The light-based object records 1257 may further include information associated with other types of light-based objects, such as cloud light formations. Such information may indicate: (1) a weather condition in which a cloud layer is formed over a city; (2) a cloud light formation corresponding to a given city; or (3) a combination thereof.

Other records 1259 may include past data for training machine learning models and/or algorithms for: (1) identifying a light-based object from an image; (2) identifying a location of a source capable of generating a light beam by using a plurality of images; (3) constructing a representation of a light-based object; (4) determining attributes of the light-based object; and (5) determining a confidence value of a representation of a light-based object. Such past data may include past image data.

In one embodiment, the database 125 can be maintained by one or more of the content providers 119 in association with a map developer. The map developer can collect geographic data 1250 to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the requesting entity 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a map layer of one or more light-based landmarks may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
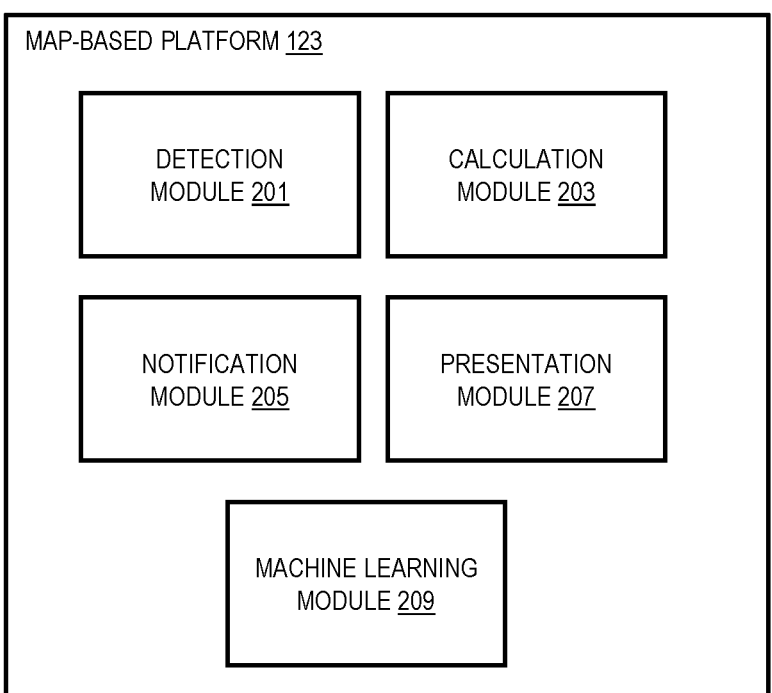
FIG. 2 illustrates a diagram of the components of the map-based platform of FIG. 1A.

FIG. 2 is a diagram of the components of the map-based platform 123, according to one embodiment. By way of example, the map-based platform 123 includes one or more components for providing a map layer of one or more light-based landmarks. It is contemplated that the functions of these components may be combined in one or more components or performed by other components of equivalent functionality. In this embodiment, the map-based platform 123 includes a detection module 201, a calculation module 203, a notification module 205, a presentation module 207, and a machine learning module 209.

The detection module 201 may acquire information and/or data for providing a map layer including one or more light-based objects. In one embodiment, the detection module 201 may acquire image data associated with one or more light-based objects from one or more detection entities 113. The image data may include: (1) an image captured by an image sensor; (2) spatial data indicating a location and orientation (e.g., angle and height) at which an image was captured; and (3) temporal data indicating a time and date at which the image was captured. The detection module 201 may also acquire weather data indicating weather conditions affecting one or more locations, where the one or more locations may be: (1) a location in which a detection entity 113 has acquired an image of a light beam; (2) a location of a source of the light beam; (3) a location proximate to the source; or (4) a combination thereof. In one embodiment, the detection module 201 may acquire location information indicating a location of a source of a light beam and/or attribute data indicating one or more attributes of a light beam from the services platform 115, the content providers 119, the database 125, or a combination thereof. For detecting cloud light formations, the detection module 201 may: (1) acquire location information associated with one or more cities from the services platform 115 from the services platform 115, the content providers 119, the database 125, or a combination thereof; and (2) acquire weather information of one or more areas including the one or more cities from the services platform 115 from (e.g., from a weather-based service platform) and/or the content providers 119 (e.g., from a weather-based content provider).

Once the detection module 201 receive location information indicating location of a light-based landmark, the calculation module 203 may estimate the exact location of a source by: (1) receiving image data acquired by one or more image sensors of a detection entity 113 that is within a proximity of the light-based landmark; (2) estimating the distance between the detection entity and the source based on the image data; (3) determining the exact location of the source based on the estimated distance; and (4) continuously receiving one or more image data acquired by one or more images sensors of one or more additional detection entities 113 that is within the proximity of the light-based landmark and at one or more different positions to validate the estimated distance or correct the exact location of the source. If location information of a source or a light-based landmark may not be available, the detection module 201 may receive image data acquired by image sensors of detection entities 113, and the calculation module 203 may determine whether the image data indicate existence of a light beam. In one embodiment, the calculation module 203 may use a machine learning model to identify one or more light beams from an image. If the image data indicates existence of a light beam, the calculation module 203 may process the image data to estimate the location of the source based on: (1) the location and the orientation at which the detection entity 113 has captured an image; (2) one or more landmarks that is within the image data and is mapped in a map layer; (3) whether the source is visible in the image; or (4) a combination thereof. The calculation module 203 may continuously validate or update the existence of the light beam and the location information of the source based on image data acquired from one or more other detection entities 113 that is proximate to the estimated location of the light-based landmark.

Figure 3:
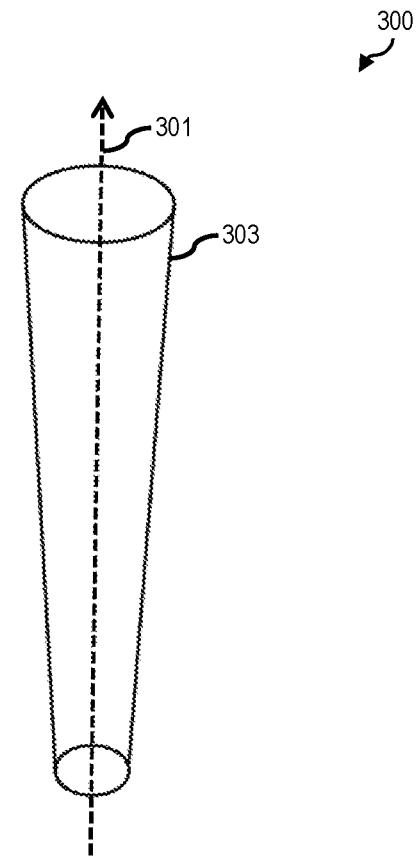
FIG. 3 illustrates an example representation of a light beam modelled with a center line and a general polygon.
Figure 4:
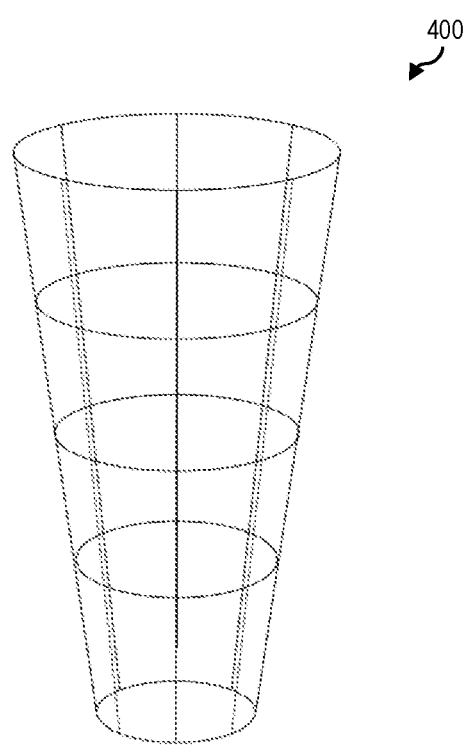
FIG. 4 illustrates an example wireframe representation of a light beam.

If the location of the source is identified, the calculation module 203 may use image data acquired by one or more detection entities 113 within the proximity of the light-based landmark to generate a representation of the light beam for a map layer. The calculation module 203 may use the image data to: (1) identify attributes of the light beam, such as an angle at which the light beam is projecting, a shape of the light beam, and a size of the light beam; (2) define a center line of the light beam based on the attributes; and (3) identify a general three-dimensional (3D) polygon that corresponds to the shape of the light beam and affix the polygon to the center line. For example, FIG. 3 illustrates an example representation 300 of a light beam modelled with a center line and a general polygon. In the illustrated example, a center line 301 corresponds to a direction and angle at which a light beam projects. A general polygon 303 corresponds to the shape of the light beam, and the representation 300 is modelled such that the center line 301 extends long a central axis of the general polygon 303. The shape and size of the general polygon 303 may be the same or similar to the light beam. In one embodiment, the calculation module 203 may use the image data to create a representation of the light beam as a wireframe attribute in the map layer with 3D coordinates. For example, FIG. 4 illustrates an example wireframe representation 400 of a light beam. As a plurality of images of the light beam are captured at different angles, the calculation module 203 may correlate each 2D shape of the light beam, as detected in each image, to 3D coordinates based on a predetermined sizing. The 3D coordinates may define the wireframe representation 400 of the light beam.

Figure 5:
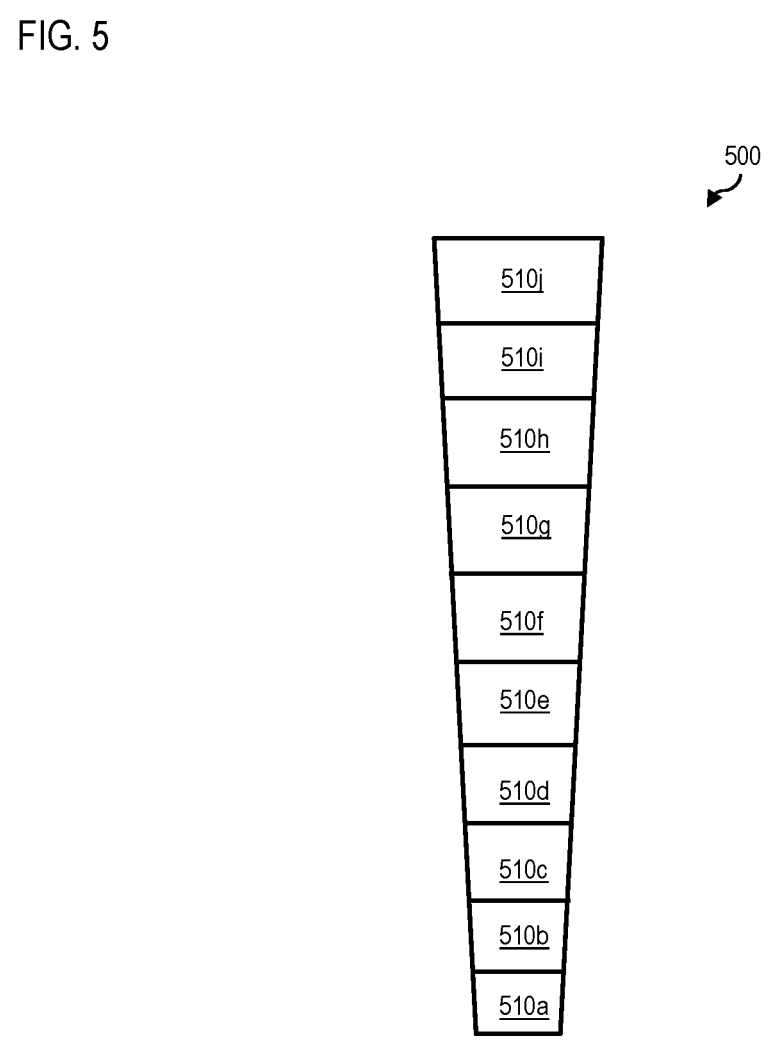

In one embodiment, a subset of the 3D coordinates may define a wireframe attribute, such as a portion of the total length of the light beam or a light attribute score. Put differently, a representation of a light beam may be divided into a plurality of zones, and each of the zones may indicate an attribute. For example, FIG. 5 illustrates an example representation 500 of a light beam that is divided into a plurality of zones. In one embodiment, each of the zones 510a-510j includes a subset of 3D coordinates that define a portion of the entire length of the representation 500. The length of the representation 500 may be calculated by analyzing one or more images of the light beam. The calculation module 203 may identify a beginning end of the representation 500 (e.g., zone 510a) and a terminating end (e.g., zone 510j) of the representation 500. The terminating of the light beam may resemble a portion of the light beam that fades to darkness. To determine the length of the light beam, the calculation module 203 may identify one or more landmarks mapped in a map layer within the one or more images and acquire attributes associated with the one or more landmarks, such as a size of a landmark. The calculation module 203 may estimate the length of the light beam based on a comparison between the light beam and the size of the one or more landmarks. In one embodiment, the calculation module 203 may acquire light attribute data associated with a light-based landmark, where the light attribute data indicate a length of a light beam generated by the light-based landmark. In one embodiment, the calculation module 203 may acquire light attribute data associated with a light-based landmark, where the light attribute data indicate an intensity at which one or more light generating devices of the light-based landmark generates a light beam. Based on the intensity of the light beam, the calculation module 203 may estimate the length at which the light beam is projected. In the illustrated embodiment, the length of each of the zones 510a-510j may be equivalent to each other. In one embodiment, each of a plurality of zones defining a representation of a light beam may be assigned with a light attribute score. By way of example, light attribute scores may range from a scale of 0 to 1.0, and a zone closest to the source may have a light attribute score of 1.0, thereby indicating that the zone is the brightest among the plurality of zones; whereas a zone furthest from the source may a have a light attribute score of 0, thereby indicating that the zone is the darkest among the plurality of zones. For example, referring back to FIG. 5, the light attributes scores of zones 510a-510j may be 1, 0.9, 0.8, 0.7, 0.6, 0.5, 0.4, 0.3, 0.2, 0.1, and 0, respectively.

Figure 6:
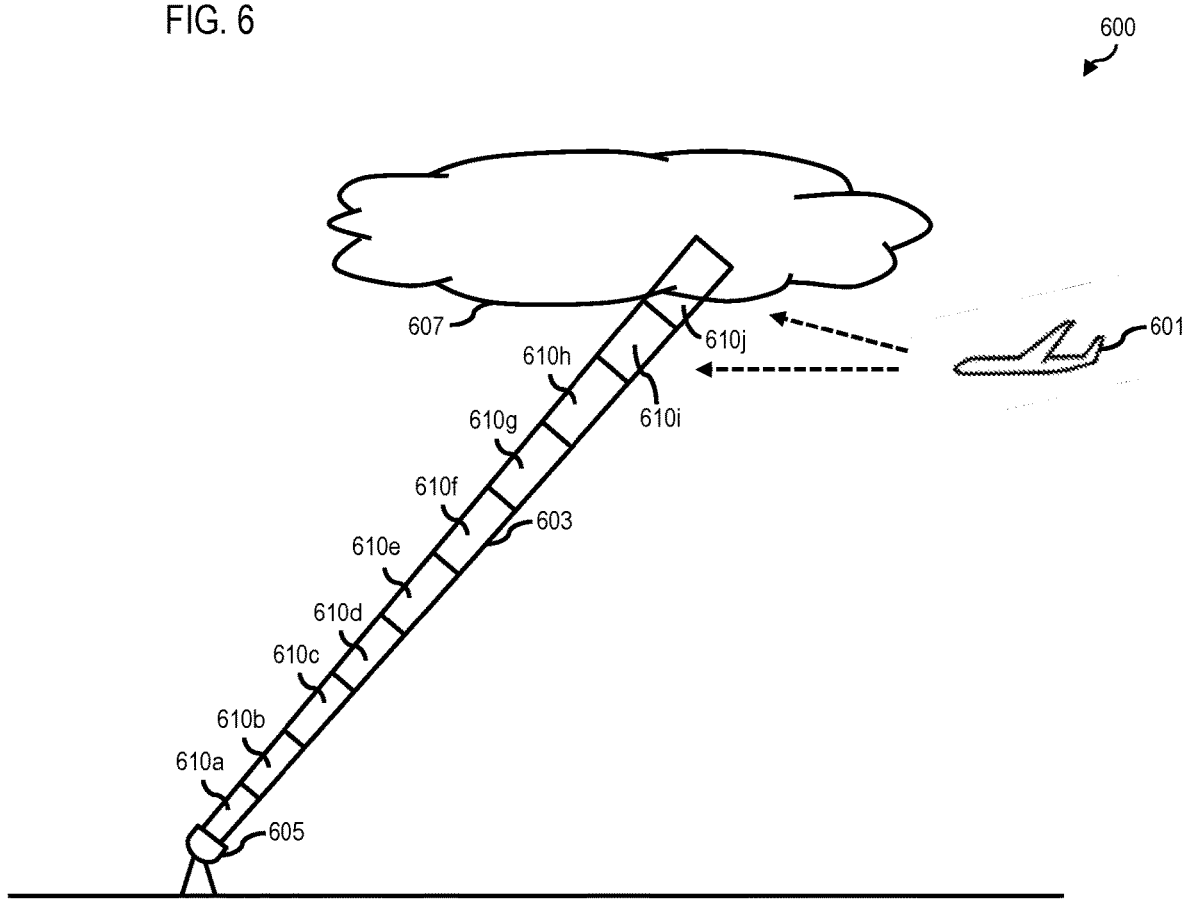
FIG. 6 illustrates an example scenario in which a light beam is used to locate an object within a range of altitudes.

In one embodiment, the calculation module 203 may estimate a range of altitudes at which each zone of a light beam is located by using an angle of the light beam, a light attribute score of each zone, and a length of each zone. For example, FIG. 6 illustrates an example scenario 600 in which a light beam is used to locate an object within a certain range of altitudes. In the illustrate example, an aircraft 601 equipped with an image sensor acquires an image of a light beam 603 generated by a source 605. The map-based platform 123 has mapped the light beam 603, and the calculation module 203 has divided a representation of the light beam 603 into a plurality of zones 610a-610j, where each of the zones 610a-610j is assigned with a length and a light attribute score. The image is transmitted to the map-based platform 123, and the calculation module 203 determines an altitude at which the aircraft 601 is flying by identifying the light attribute score of a zone that is directly in front of the aircraft 601 (i.e., zone 610i). Subsequently, the calculation module 203 calculates the range of altitudes corresponding to the zone 610i as a function of the height of the source 605, the angle of the light beam 603, the light attribute score of the zone 610i, and the length of zones 610a-610i. By applying similar calculations, the calculation module 203 may determine a range of altitudes for any one of the zones 610a-610j, thereby enabling the calculation module 203 to estimate an altitude of other objects in the sky, such as a cloud ceiling 607.

Figure 7:
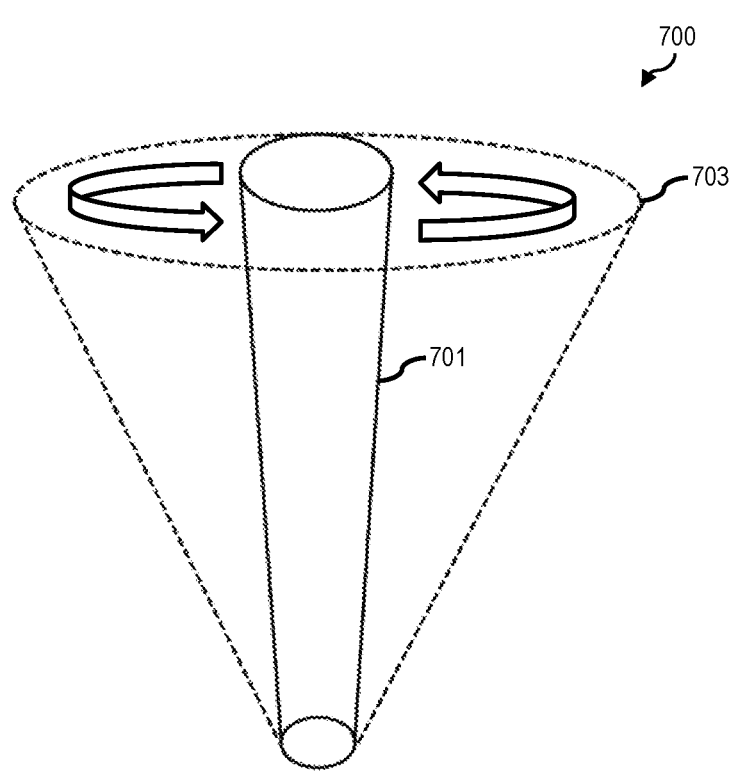
FIG. 7 illustrates a light beam movement zone.

In one embodiment, the calculation module 203 may use image data to acquire additional attributes associated with the light beam. By way of example, said additional attributes may be: (1) type of light beam; (2) colour of light beam; or (3) a combination thereof. A plurality of image data collected over time may be used to generate time-based attributes, such as: (1) one or more periods in which the light beam is activated throughout a day; (2) a pattern in which the light beam is activated/deactivated; (3) a pattern in which the intensity of the light beam fluctuates; (4) a pattern in which the colour of the light beam changes; or (5) a combination thereof. In one embodiment, the calculation module 203 may analyze a plurality of image data collected over time to determine whether the light beam is a dynamic light beam. In one embodiment, if the light beam is a dynamic light beam, the map-based platform may determine whether the dynamic light beam moves at a speed that does not exceed a predetermined threshold speed. The predetermined threshold speed may be a speed at which a requesting entity 105 cannot readily identify features of the dynamic light beam from image data for localization. In one embodiment, if the light beam is a dynamic light beam, the map-based platform may track a series of positions at which the dynamic light beam moves to determine a light beam movement zone. For example, FIG. 7 illustrates a light beam movement zone scenario 700. In the illustrated embodiment, the calculation module 203 has determined that a dynamic light beam 701 moves in a circular direction. Accordingly, the light beam movement zone 703 is defined to cover all positions of the dynamic light beam 701 as the dynamic light beam 701 moves in the circular direction. The light beam movement zone 703 may be used as a representation of the light beam within a map layer, and the light beam movement zone 703 may be used to localize the requesting entity 105.

It is contemplated that a visibility of a light beam is affected by an amount of light within an environment in which the light beam is projected. Such amount of light may vary based on: (1) a sun angle; (2) an amount of active artificial light sources proximate to the light beam; (3) and weather conditions. The calculation module 203 may account for such factors by assigning a confidence value indicating a confidence of which a representation of a light beam can be relied upon for accurate localization. As such, the greater the confidence value, the greater the confidence at which the calculation module 203 can accurately provide localization for the requesting entity 105 by using the representation of the light beam. The confidence value may be a function: (1) a sun angle with respect to an area in which the light beam is projected; (2) a number of active artificial light sources within the area and the intensity of light generated therefrom; and (3) weather conditions affecting the area. In one embodiment, the calculation module 203 may calculate the sun angle based on time and day at which a representation of a light beam is relied upon for localization. For example, if the calculated sun angle indicates an angle of the sun during daytime, the confidence value may decrease; whereas, if the calculated sun angle indicates an angle of the sun during night-time, the confidence value may increase. In one embodiment, the calculation module 203 may receive attribute data associated with one or more artificial light sources to determine a number of activate artificial light sources and the intensity of light generated therefrom. In one embodiment, the calculation module 203 may receive weather data associated an area in which the light beam is projected. For example, if the weather data indicates a weather condition such as fogginess, the confidence value may decrease; whereas if the weather data indicates a clear weather condition, the confidence value may increase.

In one embodiment, the calculation module 203 weather data associated with an area in which a light beam is projected may indicate an existence of a cloud layer and the altitude thereof. Using the weather data, the calculation module 203 may determine the altitude at which the light beam can be relied upon for localization. Alternatively, to determine an altitude at which the light beam can be relied upon for localization, the calculation module 203 may: (1) acquire an image of the light beam contacting the cloud ceiling; (2) identify a portion of the light beam contacting the cloud ceiling; (3) identify the light attribute score of the portion; (4) identify a zone among a plurality of zones that corresponds to the light attribute score; and (5) estimate the altitude based on the zone that corresponds to the light attribute score (see, for example, FIG. 6).

Figure 8A:
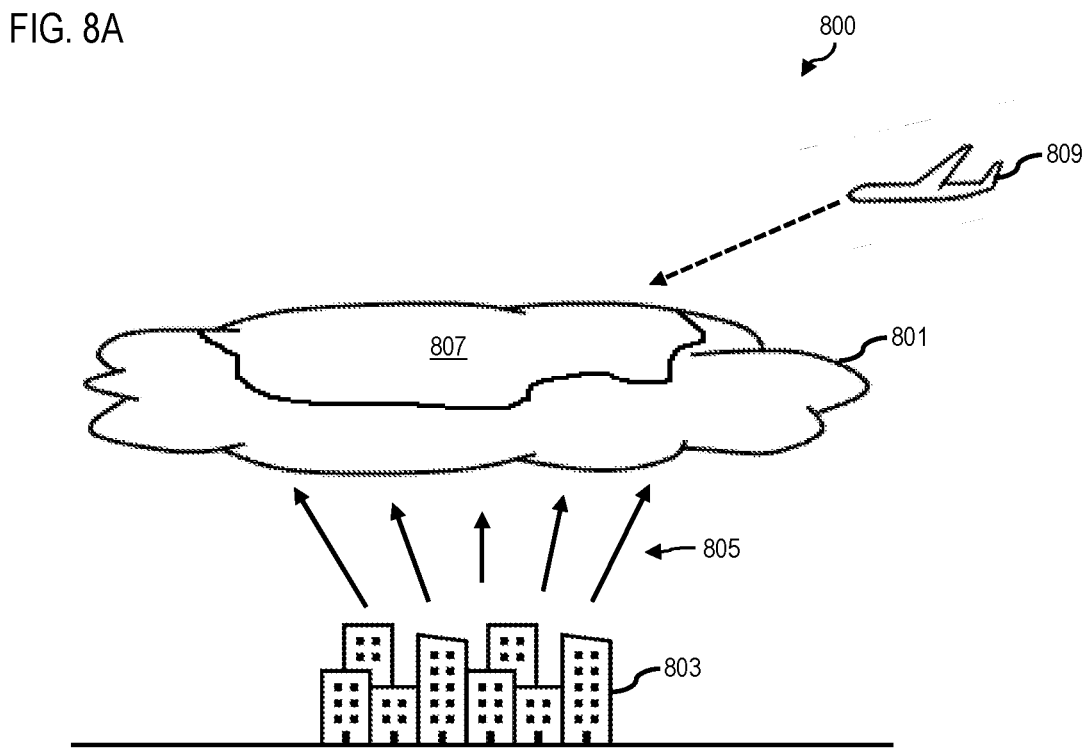
FIGS. 8A and 8B illustrate an example scenario in which an aircraft observes a cloud light formation at night-time.
Figure 8B:
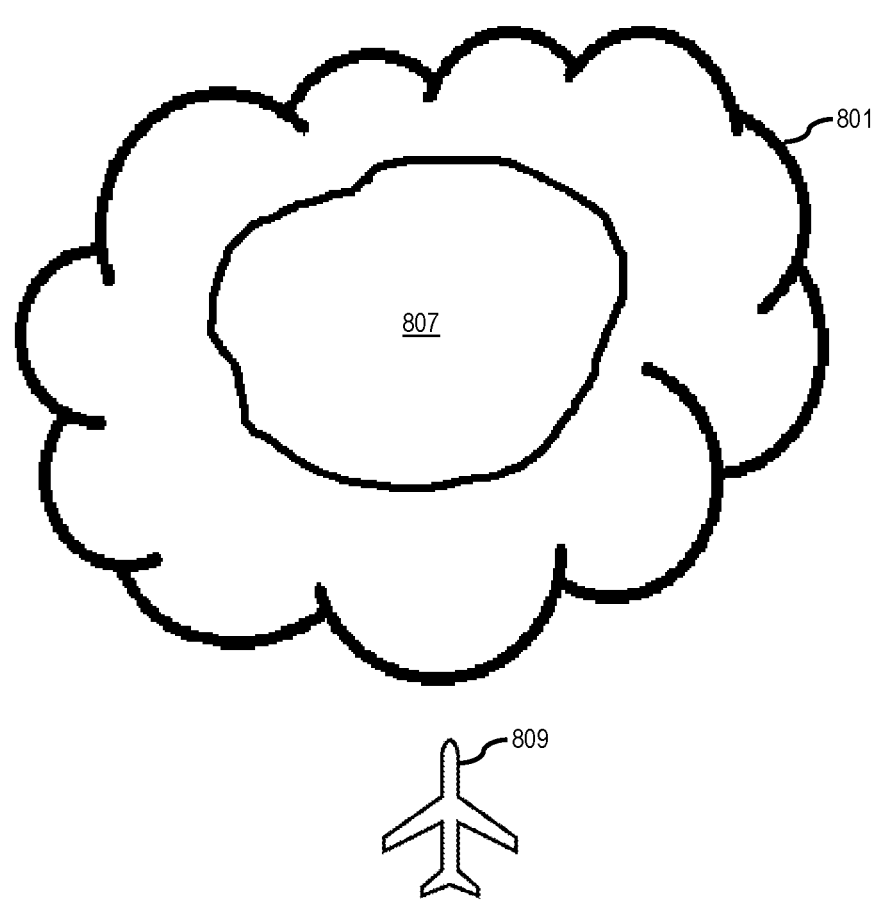

In one embodiment, the calculation module 203 may map cloud light formations. For example, FIGS. 8A and 8B illustrates an example scenario 800 in which an aircraft observes a cloud light formation at night-time. FIG. 8B illustrates a plan view of FIG. 8A. Referring to FIG. 8A, a cloud 801 is formed a city 803, and the city 803 is radiating light 805 towards the cloud 801, thereby forming a cloud light formation 807. Images of the cloud light formation 807 may be acquired by a plurality of airborne detection entities 113. Accordingly, the calculation module 203 renders a representation of the cloud light formation 807. When an aircraft 809 flying above the cloud 801 observes the cloud light formation 807 via one or more image sensors, the calculation module 203 may use images captured by said sensors to localize the aircraft 809.

In one embodiment, once the calculation module 203 updates a map layer to include one or more light-based objects, the calculation module 203 may generate a route including one or more locations in which the one or more light-based objects can be observed by an average human eye, an image sensor, or a combination thereof. The calculation module 203 may also consider a heading in which a vehicle is traversing to ensure that the driver, the image sensor, or combination thereof observes the one or more light-based objects as the vehicle traverses the route. In one embodiment, the route may be further influenced based on whether the one or more light-based objects can be observed at one or more locations without obstructions (e.g., tall buildings, trees, landmarks, etc.). Since the route includes one or more location in which an image sensor of a requesting entity 105 can clearly observe the light-based object, the requesting entity 105 may reliably perform localization based on the light-based object.

The notification module 205 may cause a notification to the UE 101, other notification devices within the requesting entity 105, local municipalities, or other establishments. In one embodiment, the notification may indicate: (1) a route in which one or more light-based objects can be observed by a requesting entity 105 and/or a detection entity 113; (2) existence of a light-based object; (3) location of the light-based object; (4) one or more attributes associated with light-based object; (5) whether the light-based object can be used for localization; (6) a confidence value associated with a light-based object; or (7) a combination thereof. The notification may be generated as a sound notification, display notification, vibration, or a combination thereof.

The presentation module 207 obtains a set of information, data, and/or calculated results from other modules, and continues with providing a presentation of a visual representation to the UE 101. The visual representation may indicate any of the information presented by the notification module 205. In one embodiment, the visual representation may be presented as a combination of map layers including a map layer including one or more light-based objects and other map layers indicating other information such road link, segment, node information, POI information, a type of weather affecting one or more areas, etc.

The machine learning module 209 embodies various machine learning models for providing a map layer of one or more light-based landmarks. Specifically, the machine learning module 209 includes models for: (1) identifying a light-based object from an image; (2) identifying a location of a source capable of generating a light beam by using a plurality of images; (3) constructing a representation of a light-based object; (4) determining attributes of the light-based object; and (5) determining a confidence value of a representation of a light-based object. The machine learning models may be trained by using historical data stored in the database 125. In one embodiment, the machine learning models may be continuously trained by the detection module 201 and the calculation module 203. For example, the detection module 201 may acquire images of light beams and information validating existence of light beams within said images, and the calculation module 203 may train the machine learning models based on the information.

The above presented modules and components of the map-based platform 123 can be implemented in hardware, firmware, software, or a combination thereof. Though depicted as a separate entity in FIG. 2, it is contemplated that the map-based platform 123 may be implemented for direct operation by the UE 101, the requesting entity 105, the services platform 115, one or more of the content providers 119, or a combination thereof. As such, the map-based platform 123 may generate direct signal inputs by way of the operating system of the UE 101, the requesting entity 105, the services platform 115, the one or more of the content providers 119, or the combination thereof for interacting with the applications 103. The various executions presented herein contemplate any and all arrangements and models.

Figure 9:
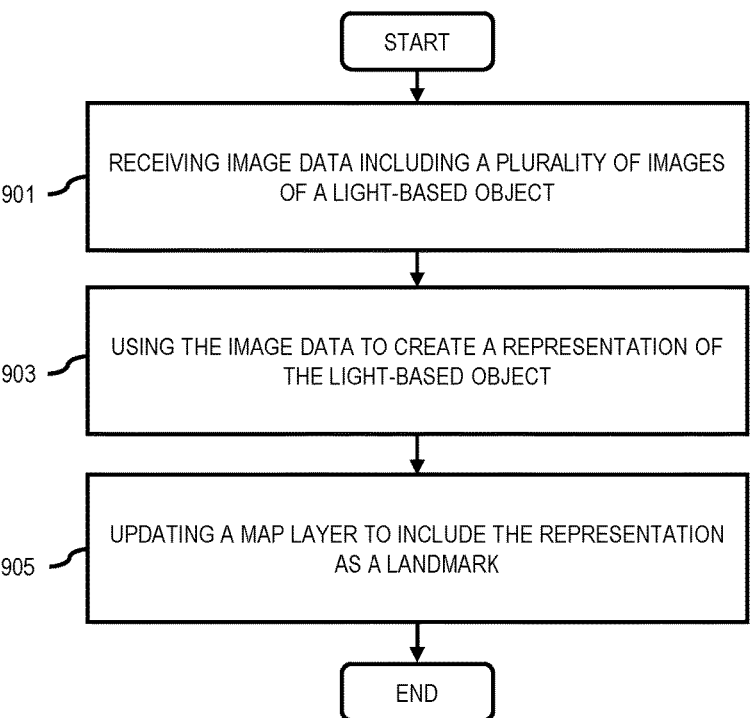
FIG. 9 is a flowchart of a process for updating a map layer including one or more light-based objects.
Figure 12:
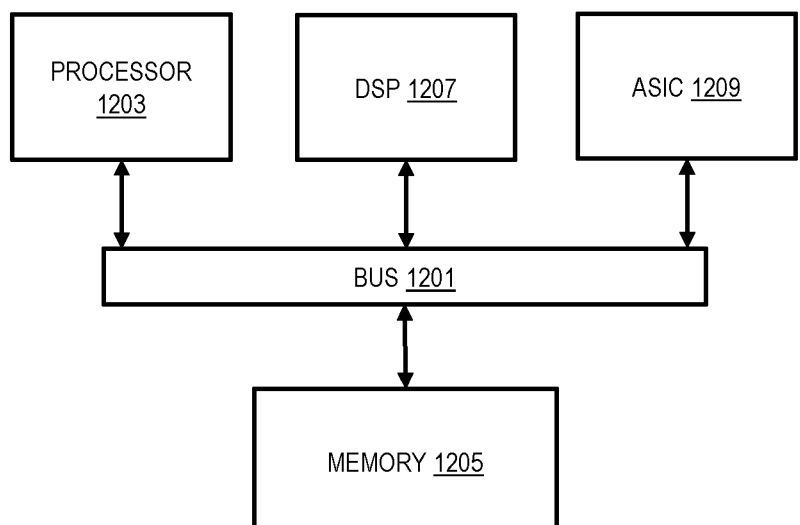
FIG. 12 illustrates a chip set or chip upon which an embodiment may be implemented.

FIG. 9 is a flowchart of a process 900 for updating a map layer including one or more light-based objects, according to one embodiment. In one embodiment, the map-based platform 123 performs the process 900 and is implemented in, for instance, a chip set including a processor and a memory as shown in FIG. 12.

In step 901, the map-based platform 123 receives image data including a plurality of images of a light-based object. The image data may be acquired from a plurality of detection entities 113, and one or more of the plurality of images of the light-based object may be captured at a different angle. A light-based object refers to an illumination having a distinct shape or a medium that defines a shape of light and is capable of being mapped and used as a reference for localization. By way of example, a light-based object may be a light beam generated by one or more light beam generating devices mounted on a landmark. By way of another example, a light-based object may be a portion of a cloud layer that defines a shape of light when light generated from an artificial source is projected on to the cloud layer at night-time. The image data may include spatial data indicating a location and orientation (e.g., angle and height) at which an image was captured and temporal data indicating a time and date at which the image was captured.

In step 903, the map-based platform 123 uses the image data to create a representation of the light based-object. If the light based object is a light beam, the map-based platform 123 may a use the image data to create the representation by: (1) identifying attributes of the light beam, such as an angle at which the light beam is projecting, a shape of the light beam, and a size of the light beam; (2) define a center line of the light beam based on the attributes; and (3) identify a 3D polygon that corresponds to the shape of the light beam and affix the polygon to the center line. Alternatively, the map-based platform 123 may use the image data to create a representation of the light beam as a wireframe attribute in the map layer with 3D coordinates. The map-based platform 123 may identify the light beam within an image of the image data as a 2D shape and correlate the 2D shape to 3D coordinates based on a predetermined sizing. If the light-based object is a cloud light formation, the map-based platform 123 may a use the image data to create the representation thereof by identifying attributes of the cloud light formation, such as a shape of the cloud light formation and a size of the cloud light formation and identifying a 3D polygon that corresponds to the shape of the cloud light formation. Alternatively, the map-based platform 123 may use the image data to create a representation of the cloud light formation as a wireframe attribute in the map layer with 3D coordinates. The map-based platform 123 may identify the cloud light formation within an image of the image data as a 2D shape and correlate the 2D shape to 3D coordinates based on a predetermined sizing.

In step 905, the map-based platform 123 updates a map layer to include the representation as a landmark. Specifically, the representation of the light-based object may be affixed to a location thereof on the map layer, and a data point may be associated with the representation, where the data point indicates one or more attribute associated with the light-based object, such as an angle at which a light beam is projecting, a weather condition in which a cloud light formation is formed, etc.

Figure 10:
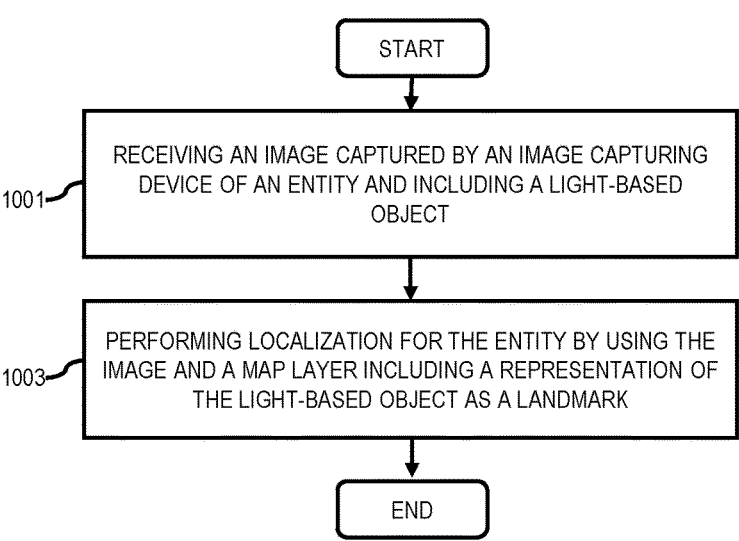
FIG. 10 is a flowchart of a process for using a map layer including one or more light-based objects for localization.

FIG. 10 is a flowchart of a process 1000 for using a map layer including one or more light-based objects for localization, according to one embodiment. In one embodiment, the map-based platform 123 performs the process 1000 and is implemented in, for instance, a chip set including a processor and a memory as shown in FIG. 12.

In step 1001, the map-based platform 123 receives an image captured by an image capturing device of a requesting entity 105 and including a light-based object. In one embodiment, the map-based platform 123 may receive the image subsequent to receiving a request form the requesting entity 105 to localize the requesting entity 105. In one embodiment, the image may be provided with spatial data indicating a location and orientation (e.g., angle and height) at which the image was captured and temporal data indicating a time and date at which the image was captured.

In step 1003, the map-based platform 123 performs localization for the requesting entity 105 using the image and a map layer including a representation of the light-based object as a landmark. To localize, the map-based platform 123 may: (1) identify a light-based object from the image; (2) compare features of the light-based object to the representation of the light-based object in the map layer; and (3) estimate a location of the image capturing device based on the comparison.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
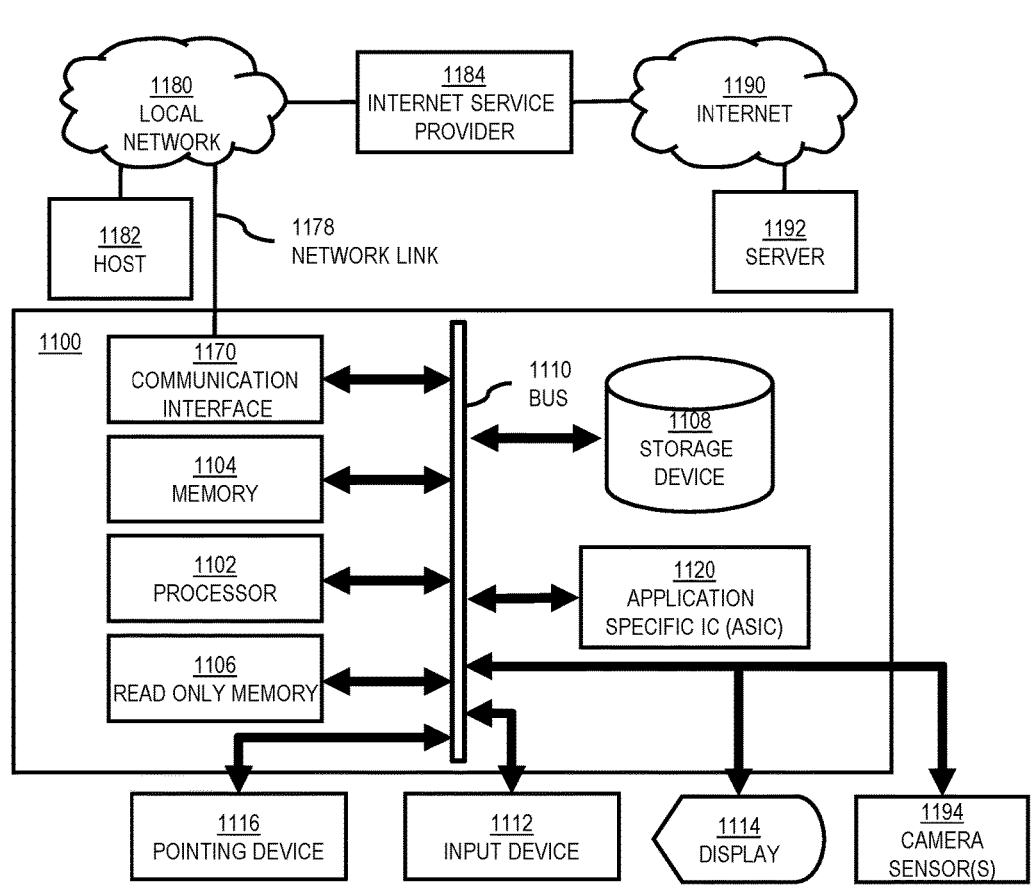
FIG. 11 illustrates a computer system upon which an embodiment may be implemented.

FIG. 11 illustrates a computer system 1100 upon which an embodiment may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to providing a map layer of one or more light-based landmarks as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for providing a map layer of one or more light-based landmarks.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing a map layer of one or more light-based landmarks. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for providing a map layer of one or more light-based landmarks. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a map layer of one or more light-based landmarks, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111 for providing a map layer of one or more light-based landmarks to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1182 connected to the Internet hosts a process that provides a service in response to information received over the Internet. For example, server host 1182 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1182 transmits program code for a particular application, requested by a message sent from computer 1100, through Internet 1190, ISP equipment 1184, local network 1180 and communications interface 1170. The received code may be executed by processor 1102 as it is received or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment may be implemented. Chip set 1200 is programmed to provide a map layer including one or more light-based objects, as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for providing a map layer of one or more light-based landmarks.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors. The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a map layer including one or more light-based objects. The memory 1205 also stores the data associated with or generated by the execution of the inventive steps.

Figure 13:
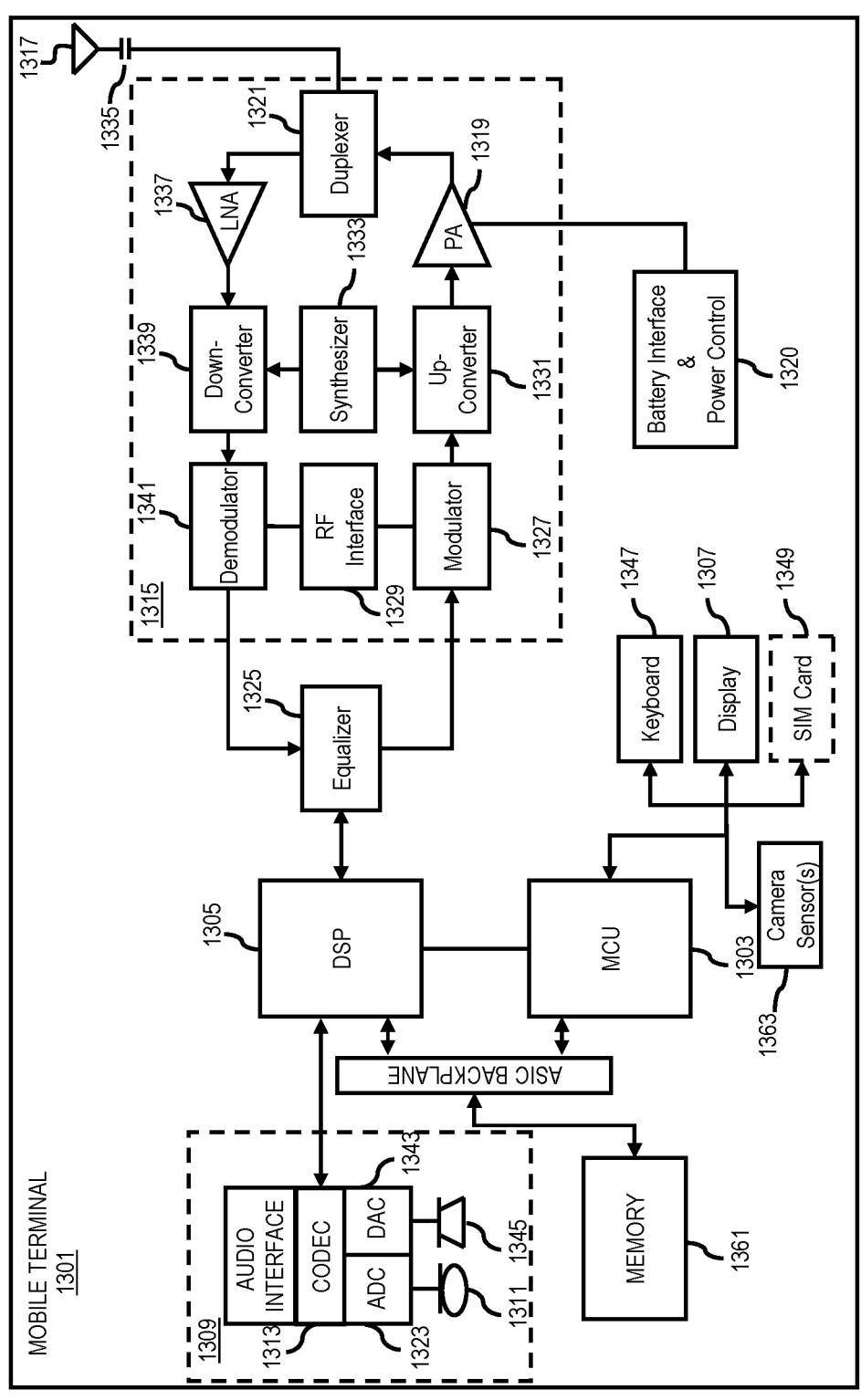
FIG. 13 illustrates a diagram of exemplary components of a mobile terminal for communications, which is capable of operating in the system of FIG. 1A.

FIG. 13 is a diagram of exemplary components of a mobile terminal 1301 (e.g., a mobile device or vehicle or part thereof) for communications, which is capable of operating in the system of FIG. 1A, according to one embodiment. In some embodiments, mobile terminal 1301, or a portion thereof, constitutes a means for providing a map layer of one or more light-based landmarks. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing a map layer of one or more light-based landmarks. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1321 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1321 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide a map layer including one or more light-based objects. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1361. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1361 stores various data including call incoming tone data and is capable of storing other data including music data received via, e.g., the global Internet. The software module could reside in RAM memory, flash memory, registers, or any other form of writable storage medium known in the art. The memory device 1361 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1363 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive image data including a plurality of images of a light beam generated by a source, wherein the plurality of images is captured at different positions and angles, and wherein each of the plurality of images include a two-dimensional shape of the light beam;
   use the plurality of images to create a wireframe representation of the light beam with three-dimensional coordinates, wherein each two-dimensional shape of the light beam, as detected in each of the plurality of images, correlates to the three-dimensional coordinates based on a predetermined sizing; and
   update a map layer to include the wireframe representation as a landmark.

2. The apparatus of claim 1, wherein the map layer comprises at least one three-dimensional component.

3. The apparatus of claim 1, wherein the wireframe representation is divided into a plurality of zones, wherein each of the plurality of zones is assigned with: (i) a brightness level.

4. The apparatus of claim 1, wherein the image data include, for each of the plurality of images, a location at which said image is captured and an orientation at which said image is captured.

5. The apparatus of claim 1, wherein the computer program code instructions are further configured to, when executed, cause the apparatus to:
   use the plurality of images to determine an attribute of the light beam as a function of time; and
   update the map layer to include a data point indicating the attribute.

6. The apparatus of claim 1, wherein the attribute indicates: (i) one or more periods in which the light beam is activated; (ii) one or more periods in which the light beam is generated with a first set of light properties and one or more other periods in which the light beam is generated with a second different set of light properties; or (iii) a combination thereof.

7. The apparatus of claim 1, wherein the computer program code instructions are further configured to, when executed, cause the apparatus to:
   receive weather data indicating a weather condition affecting an area including a location of the source; and
   update the wireframe representation based on the weather data.

8. The apparatus of claim 7, wherein the computer program code instructions are further configured to, when executed, cause the apparatus to update the wireframe representation by:
   determining an altitude at which the light beam is occluded based on the weather data; and
   update the wireframe representation to include a datapoint indicating the altitude.

9. The apparatus of claim 1, wherein the computer program code instructions are further configured to, when executed, cause the apparatus to,
   use the image data to determine whether the light beam is a dynamic light beam;
   responsive to the light beam being the dynamic light beam, use the image data to determine: (i) a series of positions at which the dynamic light beam moves; and (ii) a light beam movement zone based on the series of positions, wherein the light beam movement zone defines an area occupied by the series of positions; and update the wireframe representation as the light beam movement zone.

10. The apparatus of claim 1, wherein the plurality of images is acquired via at least one image sensor equipped by: (i) one or more vehicles; (ii) one or more mobile devices; (iii) one or more stationary road objects; or (iv) a combination thereof.

11. The apparatus of claim 3, wherein the wireframe representation is a conical cylinder.

12. The apparatus of claim 3, wherein the plurality of zones is divided along a direction in which the wireframe representation extends.

13. The apparatus of claim 12, wherein a zone from among the plurality of zones that is the closest to the source is assigned with the greatest brightness level, and wherein a zone from among the plurality of zones that is the farthest from the source is assigned with the lowest brightness level.

14. A non-transitory computer-readable storage medium having computer program code instructions stored therein, the computer program code instructions, when executed by at least one processor, cause the at least one processor to:
receive image data including a plurality of images of a light beam generated by a source, wherein the plurality of images is captured at different positions and angles, and wherein each of the plurality of images include a two-dimensional shape of the light beam;
use the plurality of images to create a wireframe representation of the light beam with three-dimensional coordinates, wherein each two-dimensional shape of the light beam, as detected in each of the plurality of images, correlates to the three-dimensional coordinates based on a predetermined sizing; and
update a map layer to include the wireframe representation as a landmark.

15. A method of acquiring location information of an entity, the method comprising:
receiving image data including a plurality of images of a light beam generated by a source, wherein the plurality of images is captured at different positions and angles, and wherein each of the plurality of images include a two-dimensional shape of the light beam;
using the plurality of images to create a wireframe representation of the light beam with three-dimensional coordinates, wherein each two-dimensional shape of the light beam, as detected in each of the plurality of images, correlates to the three-dimensional coordinates based on a predetermined sizing; and
updating a map layer to include the wireframe representation as a landmark.

* * * * *